United States Patent
Cortez et al.

(10) Patent No.: US 7,855,949 B1
(45) Date of Patent: Dec. 21, 2010

(54) METHOD AND APPARATUS FOR BUNDLING SIGNALING MESSAGES FOR SCALING COMMUNICATION NETWORKS

(75) Inventors: Bruce G. Cortez, Marlboro, NJ (US); Sanja Durinovic-Johri, Aberdeen, NJ (US); Pravin K. Johri, Aberdeen, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1330 days.

(21) Appl. No.: 10/748,782

(22) Filed: Dec. 29, 2003

(51) Int. Cl.
*G01R 31/08* (2006.01)
*H04L 12/28* (2006.01)
*H04J 3/24* (2006.01)
*G06F 15/173* (2006.01)
*G06F 11/00* (2006.01)

(52) U.S. Cl. .................. 370/216; 370/242; 370/389; 370/474; 709/238; 714/2

(58) Field of Classification Search .............. 370/216, 370/225, 242, 395.1, 395.2, 389, 410, 474; 709/238

See application file for complete search history.

(56) References Cited

U.S. PATENT DOCUMENTS

| | | | | |
|---|---|---|---|---|
| 6,147,965 A | * | 11/2000 | Burns et al. ............. | 370/216 |
| 6,807,170 B1 | * | 10/2004 | Dendi et al. ............ | 370/354 |
| 6,865,180 B1 | * | 3/2005 | Waespe ................. | 370/360 |
| 6,882,655 B1 | * | 4/2005 | Isoyama et al. ......... | 370/415 |
| 7,333,438 B1 | * | 2/2008 | Rabie et al. ............ | 370/242 |
| 7,369,547 B1 | * | 5/2008 | Pandian et al. ......... | 370/389 |
| 2004/0008619 A1 | * | 1/2004 | Doshi et al. ............ | 370/217 |
| 2005/0160171 A1 | * | 7/2005 | Rabie et al. ............ | 709/227 |

* cited by examiner

Primary Examiner—Nittaya Juntima

(57) ABSTRACT

Method and apparatus for bundling signaling messages to provide better circuit connection performance and scalability in circuit restoration during a network failure of communication networks.

9 Claims, 7 Drawing Sheets

METHOD AND APPARATUS FOR BUNDLING SIGNALING MESSAGES FOR SCALING COMMUNICATION NETWORKS

This application claims the benefit of U.S. Provisional Application No. 60/506,478 filed on Sep. 26, 2003, which is herein incorporated by reference.

The present invention relates generally to communication networks and, more particularly, to a method and apparatus for improving the performance and scalability of circuit connection establishment and disconnection used in a connection-oriented communication network by effectively bundling multiple signaling messages, e.g., during circuit restoration after a network event, e.g., a network failure.

BACKGROUND OF THE INVENTION

As communication networks grow in size, increasing numbers of circuits are affected by network events such as failures in the network. These circuits are restored sequentially with the source switch for each circuit sending signaling messages along the chosen restoration routes. It can take up to tens of milliseconds to complete the processing of all signaling messages per circuit. If there are several hundred circuits to be restored, then just the time for processing signaling messages on a single route adds up to several seconds. This type of performance does not meet requirements. Therefore, a solution is needed to reduce the amount of signaling load and improve signaling performance in large communication networks.

The method used to reduce the routing load in large networks, i.e., to send multiple routing messages within a routing packet, does not extend to signaling messages in a straightforward manner. This is because routing messages are sent only between neighboring switches. Signaling messages can go from any switch to any switch, even to those that are not directly connected. Signaling messages have to follow a specified path from one switch to another. For example, "setup" messages and the resulting "connect" messages go along the path selected by the source switch. "Release" messages go along the path the circuit was set up on. It is quite possible that two circuits between the same pair of switches are established along different paths. Hence, in order to combine signaling messages inside a signaling packet similar to the routing packet, both the source and destination switches and the circuit path must be identical.

Therefore, a need exists for a method and apparatus for bundling signaling messages in a manner that will reduce signaling load in a network.

SUMMARY OF THE INVENTION

The present invention improves the performance and scalability of circuit connection establishment and release by bundling multiple signaling messages, e.g., into a smaller number of signaling packets. In the event that a large number of circuits with a common end point pair and a common route that need to be rerouted, such as during a restoration event after a network failure, the multiple signaling messages for affected circuits can be bundled and sent in one or more signaling packets to speed up signaling related message processing and hence improve the overall network restoration time after a network failure.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to circuit-oriented communication networks. These networks include, but are not limited to, an optical switch or optical cross connect network, an Asynchronous Transfer Mode (ATM) network, a Frame Relay network, a network of Multi-Protocol Label Switching (MPLS) enabled label switched routers, and a network of Lambda (optical wavelength) routers.

These networks consist of a number of switches connected by communication links. There could be multiple links between a given pair of switches and not every pair of switches needs to be connected to each other. Links could be of various sizes that are generally expressed in bandwidth units such as DS1, DS3, OC3, OC12, OC48, etc. In all such networks, circuits are provisioned between pairs of switches and numerous classes of services are carried on these circuits. Data associated with a service passes through the switches to other switches and to end systems. End systems are points of origin and termination of the circuits and are not considered part of the network. The circuit may extend into a neighboring network instead of ending in an End system.

These networks are characterized by the fact that the intelligence is distributed in every switch and is not centralized in one or more central locations. Typically, all switches operate the same set of protocols although the functions performed by the switches may vary somewhat based on how switches are used. For example, border switches in an Open Shortest Path First (OSPF) domain have greater functionality than other switches. Thus, the switches while employing the same or similar protocols operate independently of each other. Any coordination of activities between switches is accomplished by sending control messages to each other in ways prescribed by the routing and signaling protocols.

It should also be noted that each of the switches contains the necessary hardware devices or components to implement the switching methods as disclosed below. For example, each switch may contain a central processing device, e.g., a controller, a memory device and various input/output devices (not shown). Thus, the present methods and relevant data structures can be loaded onto a computer-readable medium, e.g., a memory device, and operated by the central processing device.

These networks may use routing and signaling protocols to automate a variety of functions such as:

Self-discovery of network resources

Construction and maintenance of an identical link-state database of routing information across all switches (within an Area, Peer Group, etc.)

Automatic provisioning and restoration of circuits

Determination of paths for provisioning and restoration of circuits

Detection of network failure conditions

Flooding of information related to any change in the state of the network to all switches, including failures of switches and links, change in available bandwidth on a link, etc.

Figure 1:
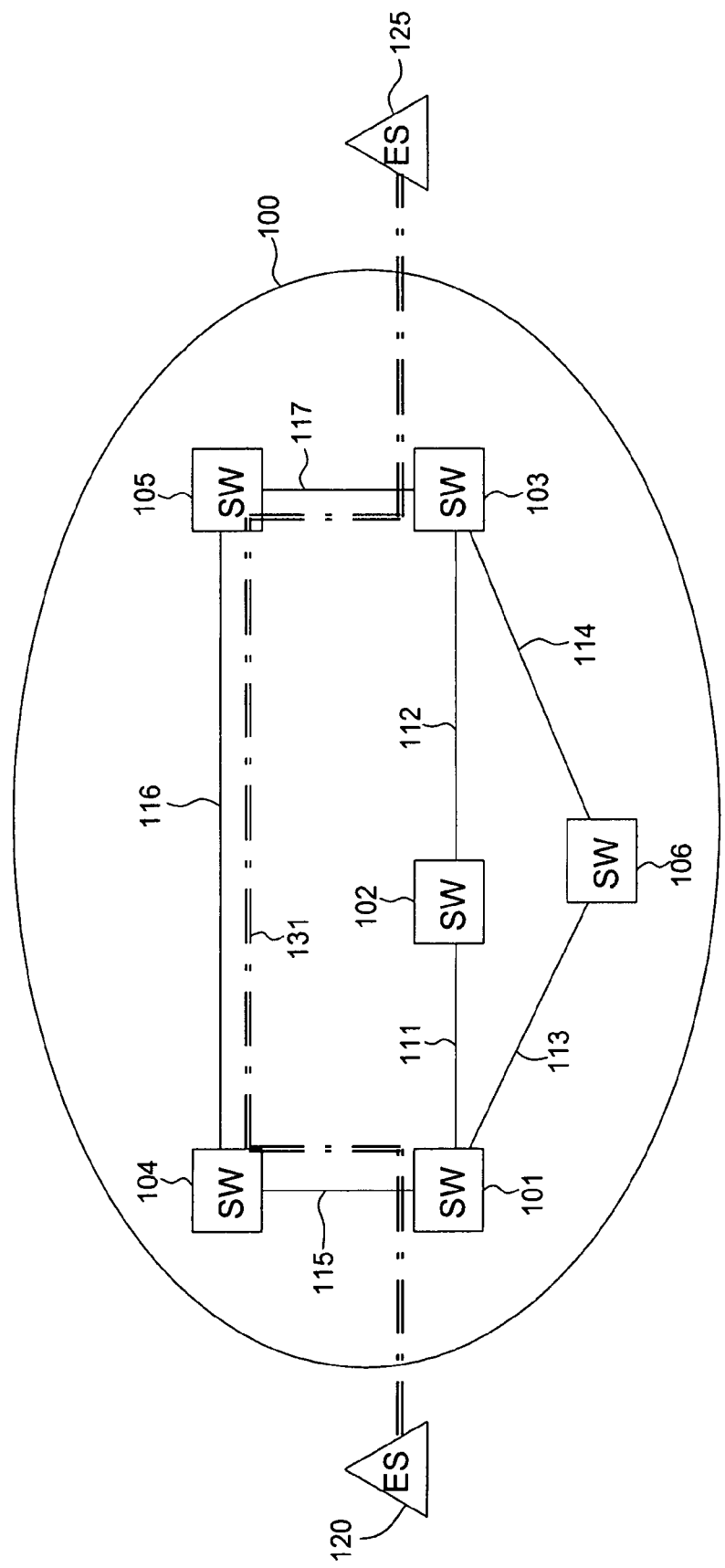
FIG. 1 illustrates a block diagram of a communication network comprising a plurality of nodes, a source end system and a destination end system.

To better understand the present invention, a description of the components of such communication networks is provided below. FIG. 1 shows an exemplary communication network 100 of the present invention. The communication network 100 comprises a plurality of switches (SW) 101-106 and links 111-117. Two end systems 120 and 125 are coupled to the communication network.

A plurality of circuits 131 to 136 can be deployed via the communication network 100. It should be noted that only circuit 131 is illustrated in FIG. 1. The circuit path information pertaining to each circuit is provided in table 1.

TABLE 1

| Circuit | Source | Destination | Path (Listed as sequence of links) |
|---|---|---|---|
| 131 | SW 101 | SW 103 | 115, 116, 117 |
| 132 | SW 101 | SW 103 | 115, 116, 117 |
| 133 | SW 101 | SW 105 | 115, 116 |
| 134 | SW 104 | SW 103 | 116, 117 |
| 135 | SW 103 | SW 101 | 117, 116, 115 |
| 136 | SW 101 | SW 103 | 111, 112 |

Although the present communication network may employ routing and signaling protocols that include OSPF, MPLS, Private Network to Network Interface (PNNI), and the like, those skilled in the art will realize that variants of these standard protocols can be adapted to the present invention. The ATM Forum PNNI specification was defined for networks of ATM switches. It has been used, with suitable modifications and extensions, in Frame Relay and optical switch networks as well. Similar extensions are possible for Internet Protocol (IP)/MPLS networks.

In one embodiment, the present invention is deployed in accordance with the PNNI routing and signaling protocols. PNNI includes two categories of protocols: a hierarchical routing protocol and a signaling protocol.

The hierarchical routing protocol is for distributing topology information between switches. This information is used to compute paths through the network. One key feature is its ability to automatically configure itself in networks in which the address structure reflects the topology. PNNI topology and routing is based on the well-known link-state routing technique.

The signaling protocol is for establishing and clearing circuits across the ATM network. This protocol is based on the ATM Forum UNI signaling, with mechanisms added to support source routing, crankback, and alternate routing of call setup requests in case of circuit setup failure.

The PNNI hierarchy consists of a maximum of 104 levels. Switches can exist at various levels of this hierarchy as Logical Nodes (or simply nodes). Logical nodes are uniquely and unambiguously identified by logical node IDs. The logical nodes in the hierarchy are connected by Logical Links that are an abstract representation of the connectivity between two logical nodes. This can be an individual physical link or an individual virtual path circuit between two lowest level nodes, as well as parallel physical links and/or virtual path circuits.

A set of logical nodes can be grouped into a Peer Group (PG) for purposes of creating the routing hierarchy. Each node in the PG exchanges information with other nodes in the PG, such that all nodes maintain an identical view of the PG. Each PG has a unique peer group identifier. A level is the position in the PNNI hierarchy at which a particular node or PG exists. A smaller numerical level value implies greater topology aggregation, and is hence called a higher level in the PNNI hierarchy. Conversely, a larger numerical level value implies less topology aggregation, and is hence called a lower level in the PNNI hierarchy.

A PNNI Topology State Element (PTSE) is a collection of PNNI information pertaining to nodes and links. The PNNI Topology State Packet (PTSP) is a type of PNNI routing packet that is used for flooding PTSEs among logical nodes within a PG. Each PTSP can contain a number of PTSEs. The switches use several levels of transmission protocols to send control (signaling and routing) messages to each other. Every control message between a pair of switches is encapsulated with lower level protocol headers before it is transmitted. When this message is received at the other end, each of these lower level headers has to be processed before the control message is extracted. The processing of the lower level headers is referred to as protocol overhead. The idea of enclosing multiple PTSEs inside a PTSP is to incur the protocol overhead only once for the PTSP and not multiple times for each individual PTSE. This, in turn, reduces the amount of CPU cycles the switch needs to spend in processing routing messages.

Each node exchanges "Hello" packets with its immediate neighbors and thereby determines its local state information. This state information includes the identity and PG membership of the node's immediate neighbors, and the status of its links to the neighbors. Each node then bundles its state information in PTSEs, which are flooded throughout the PG. A node's topology database consists of a collection of all PTSEs received, which represent that node's present view of the PNNI routing domain. In particular the topology database provides all the information required to compute a route from the given node to any address reachable in or through that routing domain.

Flooding is the reliable hop-by-hop propagation of PTSEs throughout a PG to ensure that every node gets every PTSE. Every node must send its own (self-originated) PTSEs out on all its interfaces or links from the node. Every node on receiving a PTSE from another node is expected to send copies of the PTSE out on all its interfaces or links except, perhaps, the one that goes back to the node from which the PTSE was received. Some of the switches could have more than fifty links to other neighboring switches, although there may be several parallel links to the same neighbor. Many switches are smart enough to recognize if there are multiple links to the same neighbor and flood routing messages on only one of these links.

The signaling protocol is used to establish and clear circuits across the network. A new circuit order between a pair of switches is provisioned by selecting one of the switches as the source of this circuit and the other as the destination. The source switch then calculates a path for the circuit using information collected by the routing protocol. The information typically includes network topology, available network resources, etc. The path must have sufficient network resources to meet the quality of service requirements (bandwidth, delay, etc.) of the circuit. The source switch then sets up the circuit using the signaling protocol. A "setup" message is sent out along the selected path of the circuit. Each switch in the path checks to see if the requested resources are available and then allocates the resources to the circuit. If all switches are able to allocate the resources then the setup succeeds and it fails otherwise. An unsuccessful setup attempt may result in a crankback using a "release" message to the source that then tries to set the circuit up on a different path. The new path must also have sufficient resources to meet the needs of the circuit. A successful setup results in a "connect" message sent from the destination switch back to the source switch along the selected path. On receiving the "connect" message, each switch along the path finishes the steps needed to establish the circuit.

It should be noted that there are other types of signaling messages (see ATM Forum PNNI specification for a description). Since the present invention can be applied generally to signaling messages, it can be applied to other signaling messages, such as "alerting", "call proceeding", "release complete", "notify", "status", and "status inquiry" as well.

Returning to FIG. 1, to illustrate the provisioning of circuit 131 in the network of FIG. 1, the source switch 101 must have first determined the path of the circuit. As shown, this path consists of the sequence of links 115, 116, and 117 spanning the sequence of switches 101, 104, 105, and 103. Switch 101 would then have sent out a setup message along the path of the circuit, that is, to switch 104 via link 115. Switch 104 would have worked on the setup message and would have passed it on to switch 105 via link 116, which in turn would have passed it on to switch 103 via link 117. Switch 103 would now have sent a connect message back to switch 101 via switches 105 and 104 in that order and using links 117, 116, and 115 in that order.

Whenever there is a failure, such as a fiber cut or switch failure, a number of circuits may be impacted. The switches adjacent to the failure first detect the failure condition, identify the circuits affected by it, and then initiate signaling messages releasing these circuits. The release messages travel back to the source and the destination of the circuit, releasing all resources held by the circuit along the way. The source switch then needs to determine a new path and try to establish the failed circuit on this new path. This is called restoring the circuit. The new path must have sufficient resources to meet the needs of the circuit. It must also avoid the failed part of the network. Information about the failed part is disseminated by the Routing protocol but there may be a short delay in getting this information. The release (crankback) message may also contain information regarding where the circuit (setup) failed. Generally, the procedure used to restore the circuit is identical to the method used to provision it in the first place. Often, there are some variations. Some switches pre-calculate a restoration path for each circuit. This path is attempted first whenever the circuit fails. If the setup attempt on this pre-calculated path fails, then the Dijkstra algorithm is run to obtain a new path.

It should be noted that the above description discloses a switch capable of detecting a network event, e.g., detecting a failure condition. However, it should be noted that the mechanism that detects the network event can be internal or external to the switch. Thus, the switch can be implemented in a manner where the switch receives notification of the network event.

Unsuccessful restoration attempts also result in crankbacks, and it is not unlikely that a circuit may crankback multiple times before it finally restores. Each crankback increases the amount of time the service associated with the circuit suffers an outage and it is desirable that the number of crankbacks be minimized. The failed circuits all compete for the same available network resources during restoration. It is quite likely there are insufficient network resources to restore all failed circuits. In this case, some of the circuits will not restore and remain in the failed state. Once the failure conditions clear in the network, the restored circuits may be reverted back to their original (service) paths from the restoration paths. This involves releasing the circuit on the restoration path and then setting it up on the original path. The switches typically maintain a record of the original path.

Often there are many types of services that comprise the various circuits. It is accepted practice to release the failed circuits in a priority order based on the type of service, and also to initiate the re-establishment of circuits in a similar priority order. Thus, the higher priority premium service circuits may be released first and then the lower priority basic service circuits are released. Similar, at the source nodes of the released circuits, restoration may be attempted first for the premium class of circuits and then for the basic class of circuits, i.e., selection is based on a class priority.

To further illustrate the events after a failure, assume that link 116 fails in the network 100 in FIG. 1. Circuits 131-135 ride on this link and all of these circuits will fail as a consequence of the link failure. Switches 104 and 105 are adjacent to this failure and both these switches will mark these circuits as failed. The next step performed by the switches is to send individual release messages for each circuit in the direction of the circuit away from the failure (unless the switch itself is the source or destination of the circuit). Thus, switch 104 will send out releases for circuits 131, 132, 133 and 135 on link 115 to switch 101. No release is sent for circuit 134, as switch 104 is the end point of the circuit. Similarly, switch 105 will send out releases for circuits 131, 132, 134 and 135 on link 115 to switch 103. Again, no release is sent for circuit 133, as switch 105 is the end point of the circuit. The criticality created by the prior art approach is that each signaling message is sent individually in one lower level signaling packet and, hence, it creates a large signaling processing load on switches when a large number of circuits need to be signaled at once.

To address this criticality, the present invention provides a method and apparatus for bundling multiple signaling messages, e.g., into a smaller number of signaling packets in a way that all bundled messages are between the same two end switches along the same path. For example, during restoration, there can be a large number of circuits that have failed and have to be re-established quickly. In this instance, the opportunity and benefit of bundling the signaling messages can be realized in re-establishing the circuits simultaneously.

It should be understood that the present invention can be employed in applications other than network restoration. For example, the present invention can be employed in network related applications that require rerouting or rearranging a large number of circuits in a short period of time. These applications include, but are not limited to, a network re-optimization event after a network topology or resource modification or a network re-arrangement event during upgrade or maintenance activities within the network. These events and failure events are broadly defined as network events in the present application.

In addition, it should be understood that the present invention can be employed in signaling protocols in general. Furthermore, the present invention can be employed in signaling protocols that are compliant to various signaling standards or their variants including, but are not limited to, the ATM Forum PNNI specifications and the IETF MPLS related specifications.

Furthermore, it should be understood that the present invention of bundling signaling messages is described below as applied to the setup, release, and connect signaling messages. However, the present invention can be easily adapted to other signaling messages such as alerting, call proceeding, release complete, notify, status, status inquiry and so on.

The first step after a failure in the network is for the switches adjacent to the failure to identify the affected circuits and send out release messages toward end switches associated with the affected switches. In the prior art, each switch adjacent to the failure releases each affected circuit back towards the source/destination switch of the circuit one by one using individual release messages for each affected circuit according to the procedure.

Figure 2:
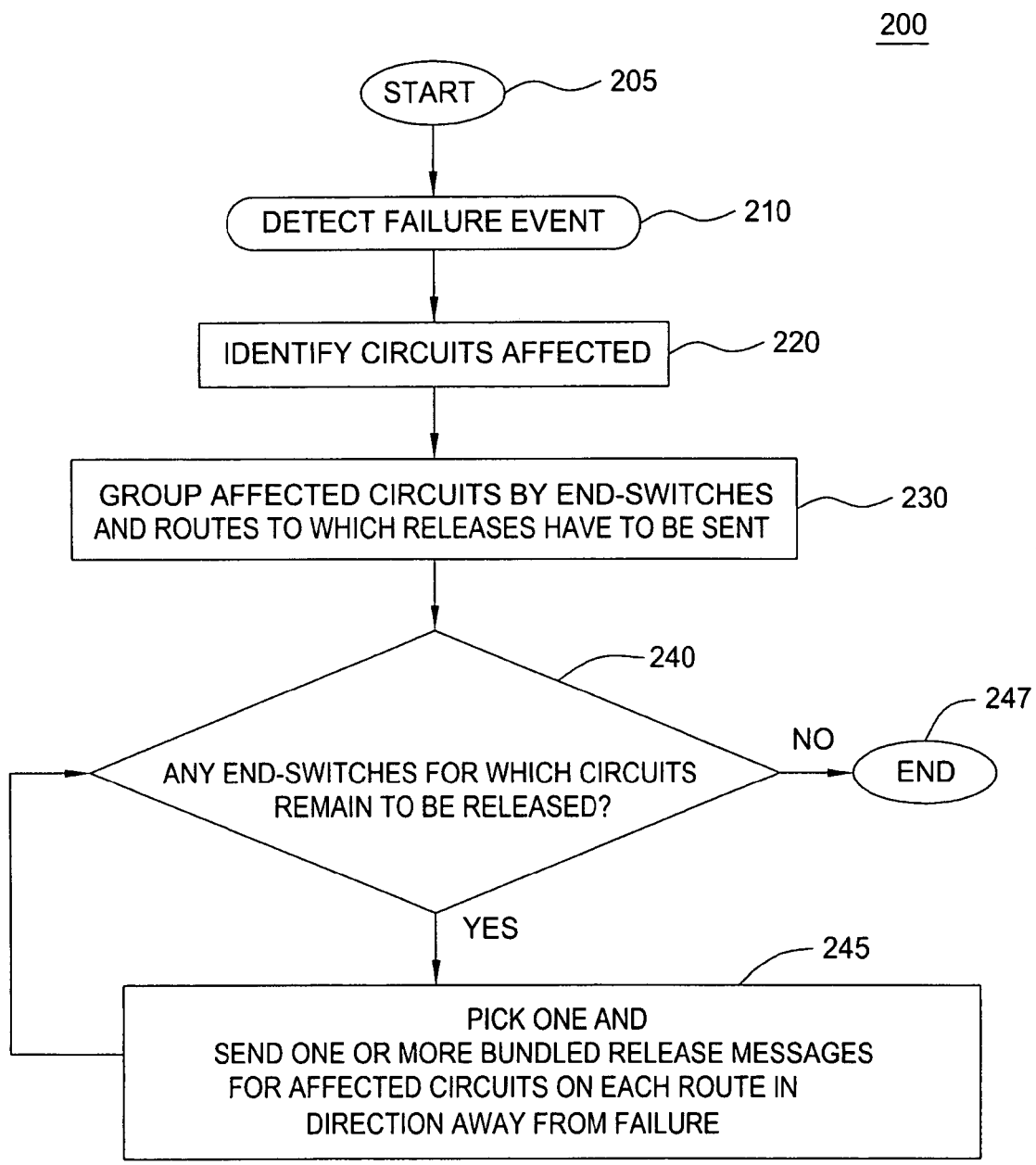
FIG. 2 illustrates a flowchart of a bundling method for releasing affected circuits of the present invention.

FIG. 2 illustrates a flowchart of a bundling method 200 for releasing affected circuits of the present invention. Method 200 starts in step 205 and proceeds to step 210.

In step 210, method 200 detects a failure event. More specifically, a switch adjacent to the failure will first detect a failure event, e.g., a physical failure of a link, and then the switch will identify all circuits affected by the detected failure in step 220.

In step 230, method 200 groups the affected circuits. More specifically, the switch groups the affected circuits into a "to-be-released" list by common end switches of the circuits to which the bundled release message packets have to be sent. In one embodiment, the grouping of the bundled release messages is accomplished by finding circuit segments of affected circuits, in the direction away from the network failure, between a switch adjacent to the network failure and a particular end switch. The circuits may take more than one route to the end switch. In this case, the circuits are further grouped by the route they take.

In step 240, method 200 queries whether there are other end-switches that will be affected, i.e., if there are any end switches for which affected circuits remain to be released. If the query is negatively answered, i.e., there is no more end switches with circuits to be released, method 200 ends in step 247. If the query is positively answered, i.e., if there is one or more end switches with circuits to be released, then the switch will select an end switch and send one or more bundled release signaling packets on each route to the switch with affected circuits associated with the selected end switch and that route in the direction away from the failure in step 245. Once step 245 is performed, the method will proceed back to step 240 to check for other remaining end switch with circuits to be released.

The method of FIG. 2 is now described with respect to FIG. 1. Using the failure of link 116 considered above as an example, once step 210 and step 220 have been performed, switch 104 will group affected circuits 131, 132, 133, 135 with a common end switch (source or destination) switch 101 into a group and add it to the to-be-released list in step 230. Switch 104 will also group affected circuit 134 with an end switch 104 into another group and add it to the to-be-released list.

Similarly and independently, switch 105 is located on the other side of the failure of link 116 as shown in FIG. 1. Once step 210 and step 220 have been performed, switch 105 will group affected circuits 131, 132, 134, 135 with a common end switch 103 into a group and add it to the to-be-released list in step 230. Switch 105 will also group affected circuit 133 with an end switch 105 into another group and add it to the to-be-released list.

Finally, switch 104 will then check the conditions in step 240 and will identify end switches 101 and 104 are switches with affected circuits to be released. Similarly and independently, switch 105 will also then check the conditions in step 240 and will identify end switches 103 and 105 are switches with affected circuits to be released.

Switch 104 will then bundle the release messages for circuits 131, 132, 133, 135 into one or more signaling packets and then send the packet to end switch 101 in the direction away from the failure of link 116. Then, switch 104 will check the condition in step 240 again and will identify end switch 104 is the only switch left with affected circuits to be released. The switch 104 will proceed to step 245 and generate and process a bundled release message for circuit 134 internally within switch 104. Since, this is done internally within the switch 104, it is not necessary to explicitly form a bundled release message and to explicitly process it, but simply to pass relevant data from the CPU task that bundles the message to the CPU task that processes the release message. Then, when the condition in step 240 is checked again by switch 104 and no more end switches with affected circuits are left in the to-be-released list, the procedure will terminate in step 247.

Similarly and independently, switch 105 will then bundle the release messages for circuits 131, 132, 134, 135 into one or more signaling packet(s) and then send the packet(s) to end switch 103 in the direction away from the failure of link 116. Then, switch 105 will check the condition in step 240 again and will identify end switch 105 is the only switch left with affected circuits to be released. Switch 105 will proceed to step 245 and generate and process a bundled release message for circuit 133 internally within switch 105. Since, this is done internally within the switch 105, it is not necessary to explicitly form a bundled release message and to explicitly process it, but simply to pass relevant data from the CPU task that bundles the message to the CPU task that processes the release message. Then, when the condition in step 240 is checked again by switch 105 and no more end switches with affected circuits are left in the to-be-released list, the method will terminate in step 247.

Upon receiving a bundled release from a switch adjacent to a network failure, an intermediate switch in the path to the end switch will appropriately de-allocate resources used by the affected circuits. The intermediate switch will then forward the bundled release message to the next switch in the path to the end switch. In the prior art, the intermediate switch will release affected circuits one by one individually during a network restoration event.

Upon receiving a bundled release from a switch adjacent to a network failure, the end switches will appropriately de-allocate resources used by the affected circuits. If an end switch is also the source switch of an affected circuit, the switch will form a to-be-restored list of circuits by adding the affected circuit to the list before triggering restoration.

The procedure of the prior art in processing release messages in an end switch is again very limiting. In the prior art, the end switch will release affected circuits one by one individually during a network restoration event.

In one embodiment, each switch pre-calculates and stores the identity of affected circuits, grouped by end switches, for possible failure scenarios. This is akin to performing steps 220 and 230 in procedure 200 for every possible failure scenario and storing the results in switch memory. Once a failure is detected, the relevant information about affected circuits is then read in from the switch memory and used in the method 200.

Figure 3:
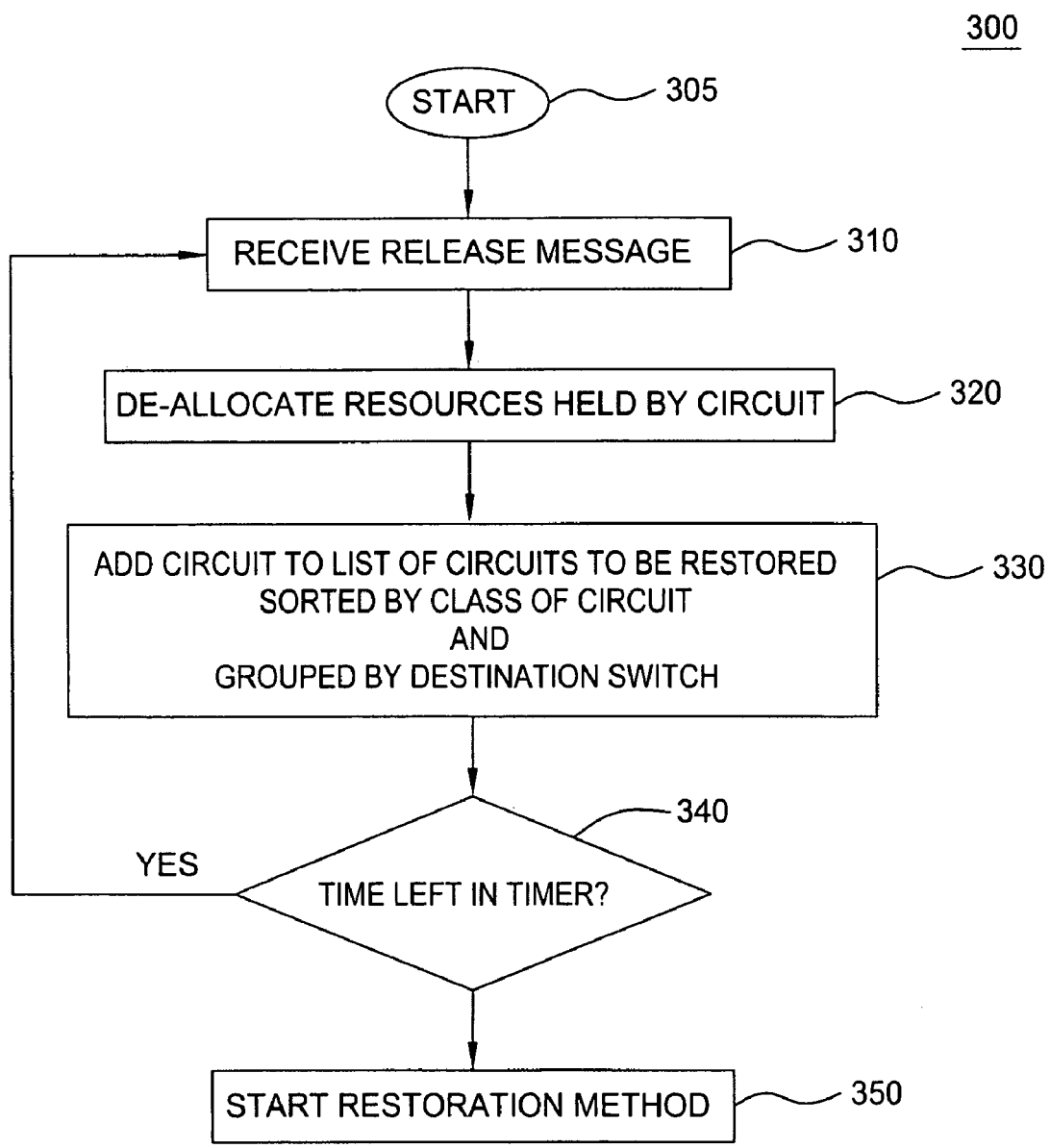
FIG. 3 illustrates a flowchart of a method for processing release messages by an end switch of the present invention.

FIG. 3 illustrates a flowchart of a method 300 for processing release messages by an end switch. It should be noted that an end switch may either be the source switch or the destination switch of a circuit. Method 300 starts in step 305 and proceeds to step 310.

In step 310, method 300 receives a release message. More specifically, an end switch receives a bundled release packet carrying a release message. The release message can be a release message for a single circuit or bundled release messages as described above. The end switch responds by releasing and de-allocating resources of all circuits contained in the release message in step 320.

In step 330, the affected released circuits will be added to a "to-be-restored" list sorted by the class of services of all circuits and also further grouped by common destination switch if the end switch is a source switch of such circuits.

In step 340, method 300 queries whether time remains in a restoration timer or counter. For example, a restoration timer is employed to provide a way to wait for a period of time to receive and to gather a plurality of release messages, i.e., a restoration method or procedure is not triggered immediately upon receipt of each and every release message. The timer is started upon the receipt of the first release message. In one embodiment, the timer value can be set to a threshold value, e.g., between 20 ms to 200 ms and shall be settable by the network administrator to meet a particular implementation requirement. If the query is positively answered, then method 300 returns to step 310 to receive additional release messages. If the query is negatively answered, then method 300 proceeds to step 350, where a restoration method is activated.

The method of FIG. 3 is now described with respect to FIG. 1. Using the failure of link 116 considered above as an example, switch 101 receives a bundled release packet with affected circuits 131, 132, 133, 135 in step 310. Switch 101 will then release and de-allocate all resources related to circuits 131, 132, 133, 135 in step 320. In step 330, switch 101, will add circuits 131, 132, 133 to the to-be-restored list and further group circuits 131, 132 into a group since they have a common destination switch 103. Circuit 133 will be grouped by itself since it has a destination switch 105 instead. Furthermore, circuit 135 is not added to the to-be-restored list at all since switch 101 is not the source node, but rather the destination node, of the circuit.

Once a restoration trigger timer has expired, the source switch will then begin to select a sub-list of circuits previously grouped by destination switch from the previously created to-be-restored list and perform path calculations for the selected circuits. In one novel embodiment of the present invention, the source switch will send out bundled setup messages in one or more setup signaling packets along the calculated path or paths previously computed. The present approach is in contrast to prior art restoration procedure that restores affected circuits one by one individually during a network restoration event.

Figure 4:
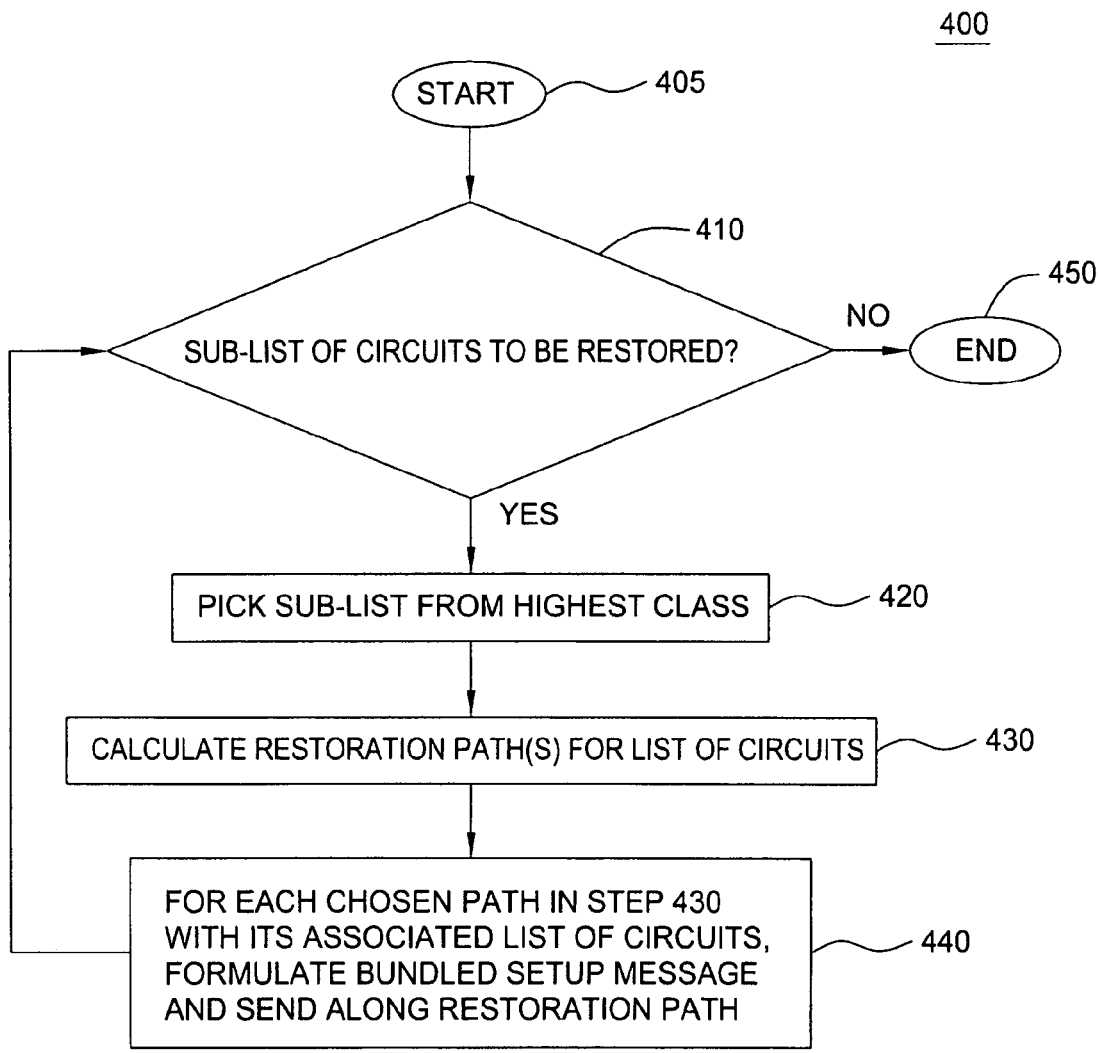
FIG. 4 illustrates a flowchart of a method for restoring affected circuits by the source switch of the present invention.

FIG. 4 illustrates a flowchart of a method 400 for restoring affected circuits by the source switch. The method starts in step 405 and proceeds to step 410.

In step 410, method 400 queries whether there are any sub-list of circuits grouped by destination switch that require restoration. For example, method 400 checks a set of sub-lists of circuits grouped by destination switch within the to-be-restored list created in step 330 in FIG. 3. If the query is negatively answered, i.e., if there is no remaining sub-list to be processed in the to-be-restored list, then method 400 ends in step 450. If the query is positively answered, i.e., if there is one or more sub-lists to be processed, then method 400 proceeds to step 420.

In step 420, method 400 selects a sub-list of circuits. In one embodiment, the source switch will first select a sub-list from the highest class of service circuits for restoration.

In step 430, method 400 calculates a restoration path(s) for the selected sub-list of circuits. More specifically, the switch will calculate the restoration path or paths for the circuits within the selected sub-list. For each calculated path with common route, the source switch will then bundle setup messages for circuits with common route into one or more signaling packets to be sent along the restoration path in step 440. Method 400 then proceeds back to step 410 to check if there is any sub-list of circuits remaining in the to-be-restored list.

In step 430, it is possible that there is no single path that can satisfy the resources needed from the selected sub-list of circuits. Therefore, more than one path will be needed to completely satisfy the demand of all circuits within the sub-list. If there is a single calculated path that can meet the demand of all circuits from the selected sub-list, then only one path is needed to satisfy the demand of the particular sub-list. If more than one path has been returned in step 430, then separate bundled setup messages must be sent along each calculated path with their associated circuits.

Once an intermediate switch receives a bundled setup message originated by a source switch, the intermediate switch will perform resource checking to determine which subset of the affected circuits within the bundled setup message can be supported. For the subset of circuits that can be supported by the intermediate switch, a modified bundled setup message is created and sent to the next switch toward the destination switch along the calculated path. For the subset of circuits that cannot be supported by the intermediate switch, a bundled release (with crankback information) message will be created and sent back to the previous switch toward the source switch along the calculated path. If all the circuits within the bundled setup message received can be supported, the bundled release message will not be needed. Again, the present invention is completely different than the prior art method of processing setup messages in an intermediate switch, where the intermediate switch processes setup messages one by one individually during a network restoration event.

Figure 5:
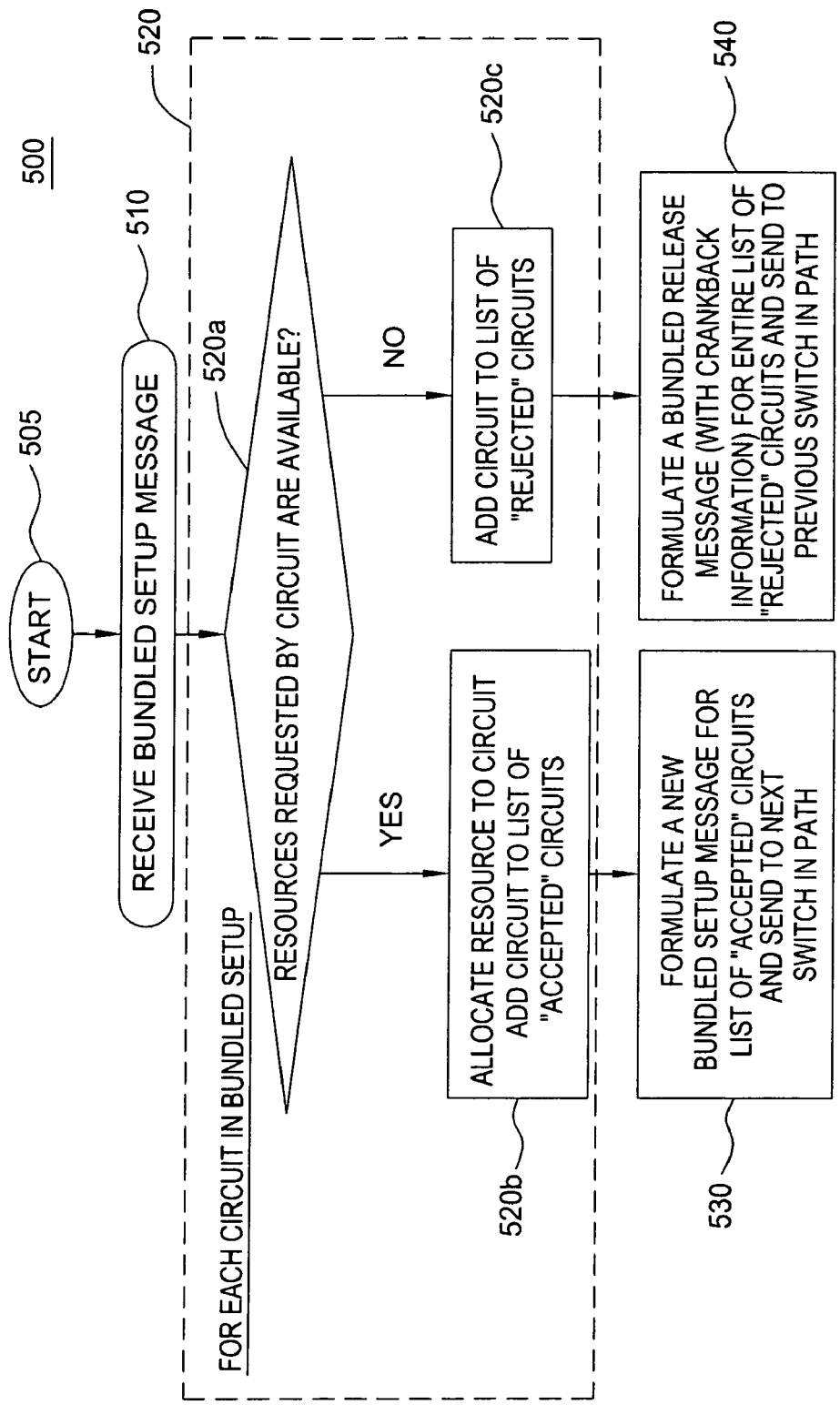
FIG. 5 illustrates a flowchart of a method for processing a bundled setup message by an intermediate switch of the present invention.

FIG. 5 illustrates a flowchart of a method 500 for processing a bundled setup message by an intermediate switch. The method starts in step 505 and proceeds to step 510 where method 500 receives a bundled setup message, e.g., receiving a bundled setup packet.

In step 520a, method 500 queries whether the resources requested for each circuit are available. Specifically, for each circuit transported within the bundled setup message, the switch will check if resources requested by the each circuit are available. If the query is positively answered, i.e., if adequate resources are available for a circuit, then method 500 proceeds to step 520b. If the query is negatively answered, then method 500 will proceed to step 520c.

In step 520b, if resources requested by a circuit are available, the switch will allocate resources to that particular circuit and add the circuit to the accepted circuit list. In step 530, once all circuits transported within the bundled setup packet are checked for resource availability, the switch will formulate a new bundled setup packet containing only bundled setup messages for circuits from the accepted circuit list and send it to the next switch toward the destination switch along the previously calculated restored route.

In step 520c, if resources requested by a circuit are unavailable, the switch will add that particular circuit to a rejected circuit list. In step 540, once all circuits transported within the bundled setup packet are checked for resource availability, the switch will formulate a new bundled release packet containing only bundled release messages (with crankback information) for circuits from the rejected circuit list and send it back to the previous switch toward the source along the previously calculated restored route. It should be noted that steps 520a-c (or shown as a single step 520) are repeated for each circuit within a bundled setup message.

Once a destination switch receives a bundled setup message, the destination switch will perform resource checking to determine which subset of the affected circuits within the bundled setup message can be supported. For the subset of circuits that can be supported by the destination switch, a bundled connect message is created and sent to the previous switch toward the source switch along the calculated path. For the subset of circuits that cannot be supported by the destination switch, a bundled release message (with crankback information) will be created and sent back to the previous switch toward the source switch along the calculated path. If all the circuits within the bundled setup message received can be supported, the bundled release message will not be needed. Again, the present invention is completely different than the prior art method of processing setup messages in a destination switch, where the destination switch will process setup messages one by one individually during a network restoration event.

Figure 6:
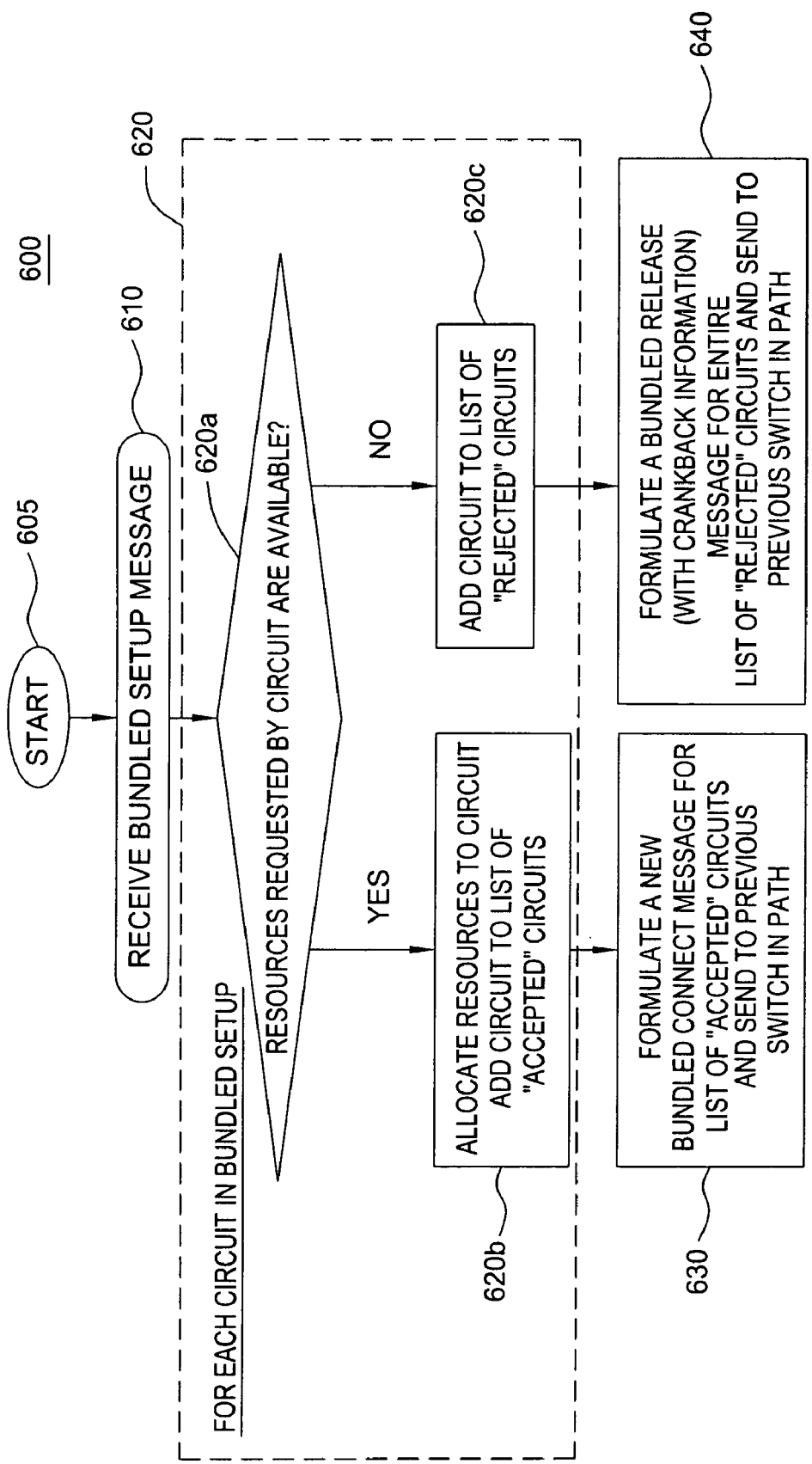
FIG. 6 illustrates a flowchart of a method for processing a bundled setup message by a destination switch of the present invention.

FIG. 6 illustrates a flowchart of a method 600 for processing a bundled setup message by a destination switch. Method 600 starts in step 605 and proceeds to step 610, a bundled setup message is received, e.g., receiving a setup packet.

In step 620a, method 600 queries whether the resources requested for each circuit are available. Specifically, for each circuit transported within the bundled setup message, the switch will check if resources requested by the each circuit are available. If the query is positively answered, i.e., if adequate resources are available for a circuit, then method 600 proceeds to step 620b. If the query is negatively answered, then method 600 will proceed to step 620c.

In step 620b, if resources requested by a circuit are available, the switch will allocate resources to that particular circuit and add the circuit to the accepted circuit list. In step 630, once all circuits within the bundled setup message are checked for resource availability, the switch will formulate a bundled connect message containing only bundled connect messages for circuits from the accepted circuit list and send it back to the previous switch toward the source switch along the previously calculated restored route.

In step 620c, if resources requested by a circuit are unavailable, the switch will add that particular circuit to a rejected circuit list. In step 640, once all circuits contained within the bundled setup message are checked for resource availability, the switch will formulate a new bundled release packet containing only bundled release messages (with crankback information) for circuits from the rejected circuit list and send it back to the previous switch toward the source switch along the previously calculated restored route. It should be noted that steps 620a-c (or shown as a single step 620) are repeated for each circuit within a bundled setup message.

Figure 7:
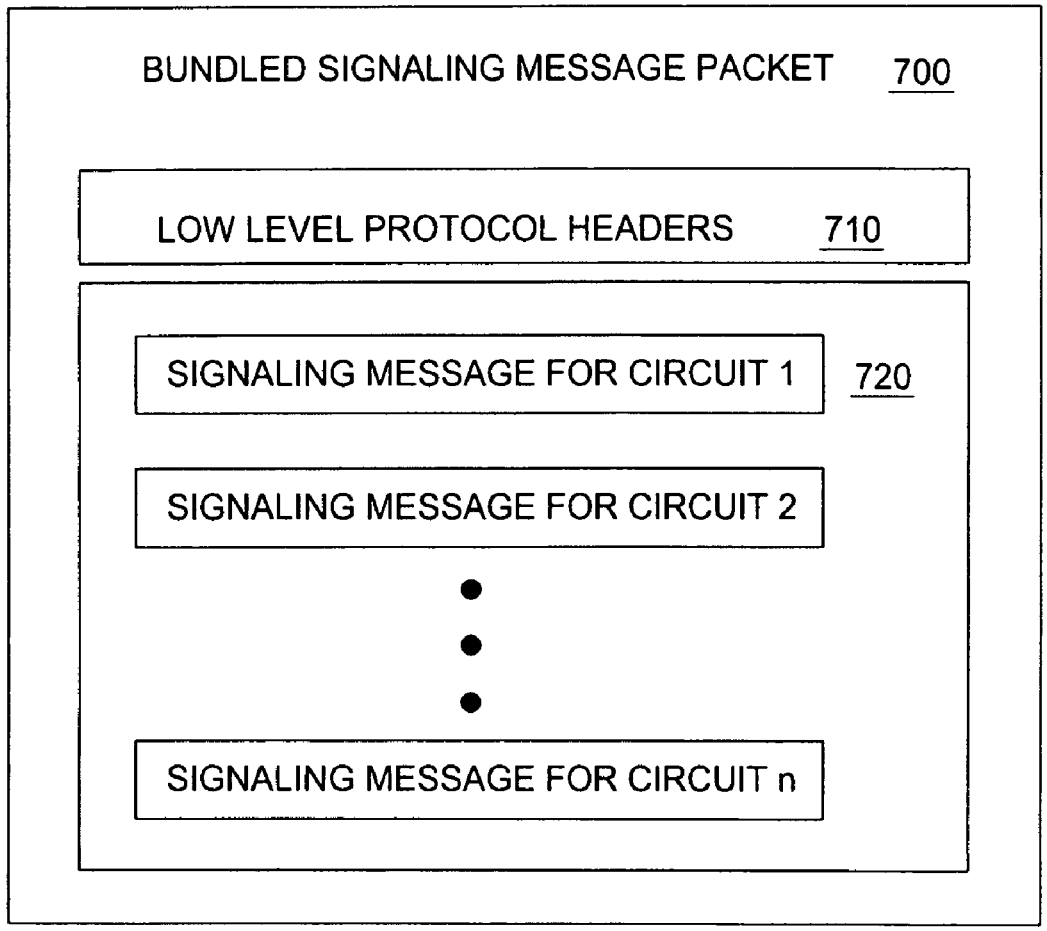
FIG. 7 illustrates the bundled signaling packet format in one embodiment of the present invention.

FIG. 7 illustrates the bundled signaling packet format in one embodiment of the present invention. In general, the packet 700 shall contain lower level protocol headers 710 and one of more signaling messages 720 of the same message type to be bundled within the packet.

Since control signaling packet has a fixed maximum size, it is possible that more than one packet is needed for bundling multiple signaling messages. However, it is also possible that one packet may be sufficient to carry one or more bundled messages. Thus, the present invention is not limited by the packetization method.

Additionally, the present bundling methods and data structures can be represented by one or more software applications (or even a combination of software and hardware, e.g., using application specific integrated circuits (ASIC)), where the software is loaded from a storage medium, (e.g., a ROM, a magnetic or optical drive or diskette) and operated by the CPU in the memory of the switch. As such, the present bundling methods and data structures of the present invention can be stored on a computer readable medium, e.g., RAM memory, ROM, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for reducing signaling load in a communication network having a plurality of switches, the method comprising:

receiving a notification of a link failure at a first switch and a second switch adjacent to a link associated with the link failure;

identifying a first plurality of circuits in a first direction affected by the link failure by the first switch and identifying a second plurality of circuits in a second direction affected by the link failure by the second switch, wherein each circuit of the first plurality of circuits and the second plurality of circuits comprises a path of a plurality of links;

grouping affected circuits in accordance with a first plurality of end-switches to which a first plurality of signaling messages have to be sent by the first switch and a second plurality of end-switches to which a second plurality of signaling messages have to be sent by the second switch;

bundling the first plurality of signaling messages for each of the first plurality of end-switches in accordance with the affected circuits that are grouped by the first switch and the second plurality of signaling messages for each of the second plurality of end-switches in accordance with the affected circuits that are grouped by the second switch; and forwarding a respective bundle of signaling messages of the first plurality of signaling messages to one of the first plurality of end-switches by the first switch in the first direction away from the link failure and forwarding a respective bundle of signaling messages of the second plurality of signaling messages to one of the second plurality of end-switches by the second switch in the second direction away from the link failure, wherein the affected circuits that are grouped are added to a "to-be-restored" list sorted by a class of services of all circuits by an end switch of the first plurality of end-switches or the second plurality of end-switches.

2. The method of claim 1, wherein the forwarding forwards the respective bundle of signaling messages of the first plurality of signaling messages or the respective bundle of signaling messages of the second plurality of signaling messages in a signaling packet.

3. The method of claim 1, wherein the forwarding forwards the respective bundle of signaling messages of the first plurality of signaling messages or the respective bundle of signaling messages of the second plurality of signaling messages for circuits with a common end switch.

4. The method of claim 3, wherein the forwarding forwards the respective bundle of signaling messages of the first plurality of signaling messages or the respective bundle of signaling messages of the second plurality of signaling messages for circuits with the common end switch along a common path.

5. The method of claim 1, wherein the first plurality of signaling messages and the second plurality of signaling messages are release messages.

6. A system for reducing signaling load in a communication network having a plurality of switches, the apparatus comprising:

a first switch comprising a first controller adjacent to a link associated with a link failure for receiving a notification of the link failure, and for identifying a first plurality of circuits in a first direction affected by the link failure, wherein each circuit of the first plurality of circuits comprises a path of a plurality of links, and for grouping affected circuits in accordance with a first plurality of end-switches to which a first plurality of signaling messages have to be sent, for bundling the first plurality of signaling messages for each of the first plurality of end-switches in accordance with the affected circuits that are grouped and forwarding a respective bundle of signaling messages of the first plurality of signaling messages that are bundled to one of the first plurality of end-switches by the first switch in the first direction away from the link failure; and a second switch comprising a second controller adjacent to the link associated with the link failure for receiving a notification of the link failure, and for identifying a second plurality of circuits in a second direction affected by the link failure, wherein each circuit of the second plurality of circuits comprises a path of a plurality of links, and for grouping affected circuits in accordance with a second plurality of end-switches to which a second plurality of signaling messages have to be sent, for bundling the second plurality of signaling messages for each of the second plurality of end-switches in accordance with the affected circuits that are grouped and forwarding a respective bundle of signaling messages of the second plurality of signaling messages that are bundled to one of the second plurality of end-switches by the second switch in the second direction away from the link failure, wherein the affected circuits that are grouped are added to a "to-be-restored" list sorted by a class of services of all circuits by an end switch of the first plurality of end-switches or the second plurality of end-switches.

7. The system of claim 6, wherein the first controller forwards the respective bundle of signaling messages of the first plurality of signaling messages to one of the first plurality of end-switches and the second controller forwards the respective bundle of signaling messages of the second plurality of signaling messages to one of the second plurality of end-switches.

8. The system of claim 7, wherein the respective bundle of signaling messages of the first plurality of signaling messages or the respective bundle of signaling messages of the second plurality of signaling messages is forwarded for circuits with a common end switch.

9. A non-transitory computer-readable medium having stored thereon a plurality of instructions, the plurality of instructions including instructions which, when executed by a processor, cause the processor to perform a method comprising of:

receiving a notification of a link failure at a first switch and a second switch adjacent to a link associated with the link failure;

identifying a first plurality of circuits in a first direction affected by the link failure by the first switch and identifying a second plurality of circuits in a second direction affected by the link failure by the second switch, wherein each circuit of the first plurality of circuits and the second plurality of circuits comprises a path of a plurality of links;

grouping affected circuits in accordance with a first plurality of end-switches to which a first plurality of signaling messages have to be sent by the first switch and a second plurality of end-switches to which a second plurality of signaling messages have to be sent by the second switch;

bundling the first plurality of signaling messages for each of the first plurality of end-switches in accordance with the affected circuits that are grouped by the first switch and the second plurality of signaling messages for each of the second plurality of end-switches in accordance with the affected circuits that are grouped by the second switch; and forwarding a respective bundle of signaling messages of the first plurality of signaling messages to one of the first plurality of end-switches by the first switch in the first direction away from the link failure and forwarding a respective bundle of signaling messages of the second plurality of signaling messages to one of the second plurality of end-switches by the second switch in the second direction away from the link failure, wherein the affected circuits that are grouped are added to a "to-be-restored" list sorted by a class of services of all circuits by an end switch of the first plurality of end-switches or the second plurality of end-switches.

* * * * *